(12) United States Patent
Saber et al.

(10) Patent No.: US 11,738,876 B2
(45) Date of Patent: Aug. 29, 2023

(54) ELECTRICAL PROPULSION UNIT FOR AN AIRCRAFT AND METHOD FOR USING SUCH A PROPULSION UNIT

(71) Applicant: SAFRAN, Paris (FR)

(72) Inventors: Christelle Saber, Moissy-Cramayel (FR); Anthony Gimeno, Moissy-Cramayel (FR); Sébastien Merle, Moissy-Cramayel (FR)

(73) Assignee: Safran, Paris (FR)

( * ) Notice: Subject to any disclaimer, the term of this patent is extended or adjusted under 35 U.S.C. 154(b) by 93 days.

(21) Appl. No.: 17/431,672

(22) PCT Filed: Feb. 17, 2020

(86) PCT No.: PCT/EP2020/054010
§ 371 (c)(1),
(2) Date: Aug. 17, 2021

(87) PCT Pub. No.: WO2020/169497
PCT Pub. Date: Aug. 27, 2020

(65) Prior Publication Data
US 2022/0348338 A1    Nov. 3, 2022

(30) Foreign Application Priority Data
Feb. 18, 2019   (FR) ..................... 1901595

(51) Int. Cl.
*H02K 9/22*    (2006.01)
*H02K 7/08*    (2006.01)
(Continued)

(52) U.S. Cl.
CPC .............. *B64D 27/24* (2013.01); *B64C 11/48* (2013.01); *B64D 35/06* (2013.01); *H02K 7/08* (2013.01); *H02K 9/227* (2021.01); *H02K 16/02* (2013.01)

(58) Field of Classification Search
CPC ........... H02K 9/227; H02K 7/08; H02K 16/02
(Continued)

(56) References Cited

U.S. PATENT DOCUMENTS 3,997,131 A   12/1976   Kling
7,032,859 B2   4/2006   Mohr
(Continued)

FOREIGN PATENT DOCUMENTS

CN   103085959 A  *  5/2013  ............... B63H 1/16
CN   207150378 U  *  3/2018
(Continued)

OTHER PUBLICATIONS

Search Report from the French Intellectual Property Office on corresponding FR application (FR1901595) dated Nov. 13, 2019.
(Continued)

*Primary Examiner* — Jose A Gonzalez Quinones
(74) *Attorney, Agent, or Firm* — KOS IP Law LLP (57) ABSTRACT

The invention relates to an electric propulsion unit for an aircraft comprising at least one first propulsion member, a second propulsion member and a single electric motor configured to drive the first propulsion member and the second propulsion member in a counter-rotating manner, the electric motor comprising a peripheral stator element comprising a first peripheral stage and a second peripheral stage which are offset along an axis, the first peripheral stage comprising at least a first phase, a second phase and a third phase which are alternated according to a first sequence in such a way as to allow a rotation of the first rotor element in the first direction of rotation, the second peripheral stage comprising phases which are alternated according to a second sequence in such a way as to allow a counter-rotating rotation of the second rotor element.

19 Claims, 4 Drawing Sheets

(51) Int. Cl.
*H02K 16/02* (2006.01)
*B64D 27/24* (2006.01)
*B64C 11/48* (2006.01)
*B64D 35/06* (2006.01)

(58) Field of Classification Search
USPC .............................................. 310/74, 98, 114
See application file for complete search history.

(56) References Cited

U.S. PATENT DOCUMENTS

| | | | |
|---|---|---|---|
| 2005/0082421 A1 | 4/2005 | Perlo et al. | |
| 2009/0121073 A1* | 5/2009 | Doane ................. | B64C 29/0066 244/129.4 |
| 2010/0001143 A1 | 1/2010 | Bojiuc | |

FOREIGN PATENT DOCUMENTS

| | | | | |
|---|---|---|---|---|
| DE | 2420709 A | * | 11/1975 | ............. B64C 27/00 |
| DE | 2420709 A1 | | 11/1975 | |
| WO | WO 2005/072233 A2 | | 8/2005 | |

OTHER PUBLICATIONS

International Search Report and Written Opinion on corresponding PCT application (PCT/EP2020/054010) from International Searching Authority (EPO) dated Apr. 24, 2020.

* cited by examiner

ELECTRICAL PROPULSION UNIT FOR AN AIRCRAFT AND METHOD FOR USING SUCH A PROPULSION UNIT

TECHNICAL FIELD

This invention relates to the field of electric or hybrid electric propulsion of an aircraft, in particular that is capable of vertical takeoff and landing.

An aircraft comprising a plurality of electric propulsion units distributed throughout the aircraft has been proposed in a known manner. An electric propulsion unit comprises one or more propulsion members, propellers or fans, in a known manner. Each propulsion member is connected to an electric drive motor. Each electric drive motor is connected to an electric inverter in order to control its operation. The power inverter is connected to an electric power supply source (for example, an onboard battery or an electric voltage generator associated with a rectifier) through a passive component, for example, a bus capacitor. The electric inverter comprises a plurality of controllable switches that receive commands from a computer that implements the control laws. In practice, this electric drive chain has a large mass and a large footprint, which penalizes the electric propulsion performances.

In particular, for an electric propulsion unit comprising two counter-rotating propulsion members, the integration of two different electric motors to drive the two propulsion members is complex.

An aircraft comprising several electric propulsion units, each comprising two counter-rotating propulsion members mounted in a casing is known in prior art, as disclosed in patent application EP2668097. The propulsion members are driven by electric motors, positioned outside the casing, connected to the propulsion members by mechanical shafts so as to limit the weight of the assembly comprising the casing, which increases the size and the mass of the propulsion architecture.

Furthermore, prior art disclosed in patent application U.S. Pat. No. 7,712,701 includes an aircraft comprising several electric propulsion units, each electric propulsion unit comprising two counter-rotating propulsion members mounted in a peripheral casing and connected to a central hub. The propulsion members are mounted rotating relative to the hub in the peripheral casing. The electric motors are integrated into the hub in order to drive the propulsion members. Nevertheless, such a propulsion architecture has the disadvantage of significantly increasing the hub diameter, which decreases the section of the air stream and affects the propulsion efficiency.

One of the objectives is thus to reduce the mass and footprint of an electric propulsion unit so as improve the propulsion efficiency.

incidentally, document US2009121073A1 discloses a vertical propulsion unit with several stages and electric cables arranged in axial channels. Two adjacent channels have different orientations so as to form fields with opposite polarities. Document US70322859B2 discloses a propulsion unit with a housing inside which a stator is mounted comprising a plurality of windings that are controlled independently by a control module. Documents DE2420709A1 and U.S. Pat. No. 3,997,131A1 relate in particular to a turbomachine propulsion unit comprising a magnetized rotor that is driven by an electricity generator. A control module is used to control current pulses to allow a drive in opposite directions.

SUMMARY

The invention relates to an electric propulsion unit for an aircraft, the electric propulsion unit comprising at least one first propulsion member rotating about an X-axis, a second propulsion member rotating about the X axis and a single electric motor with magnets configured to drive the first propulsion member in a first direction of rotation and the second propulsion member counter-rotating in a second direction of rotation.

The invention is remarkable in that the electric motor comprises:
- a peripheral stator element comprising a peripheral first stage and a peripheral second stage that are offset along the X axis,
- a first rotor element, rigidly attached to the first propulsion member, configured to be magnetically driven by the first peripheral stage,
- a second rotor element, rigidly attached to the second propulsion member, configured to be magnetically driven by the second peripheral stage,
- the first peripheral stage comprising at least a first phase, a second phase and a third phase that are alternated according to a first sequence so as to allow the first rotor element to rotate in the first direction of rotation,
- the second peripheral stage comprising at least the first phase, the second phase and the third phase that are alternated according to a second sequence so as to allow the second rotor element to rotate in the second direction of rotation opposite to the first direction of rotation,
- the first phase, the second phase and the third phase of the first peripheral stage are electrically connected to the first phase, the second phase and the third phase of the second peripheral stage, respectively.

As a result of the invention, a single stator element may control two rotor elements in counter-rotation, so that they rotate in counter-rotation. Advantageously, the electric propulsion unit obtained has a simple design with a high power density, i.e., high power for a reduced footprint and mass. The use of counter-rotating propulsion members can optimize straightening of the air flow, which improves the propulsion efficiency and reduces acoustic nuisances. There is no need to use a control module to control several stator elements independently, in particular to synchronize them.

Preferably, the electric propulsion unit comprises a peripheral casing extending along the X axis, the propulsion members being mounted in the peripheral casing. Preferably, the peripheral stator element is mounted in the peripheral casing.

Advantageously, the use of a peripheral casing makes it possible to guide the air flow as it is accelerated by the propulsion members. In addition, the peripheral casing houses the stator element. This dual function increases compactness and therefore the power density.

Preferably, the rotor elements are guided in the peripheral casing. In other words, there is no single guide through the central hub, as was the case in prior art. Such a design makes it possible to increase the passage section of the air flow in the peripheral casing.

According to one preferred aspect, the first rotor element and the second rotor element each has a peripheral form. This provides a practical manner of guiding them around the entire circumference.

According to one aspect of the invention, the electric motor is a permanent magnet motor, in particular with radial flux.

Preferably, the first rotor element and the second rotor element are mounted to be external to the first propulsion member and the second propulsion member, respectively. This makes it possible for the rotor elements to cooperate directly with the peripheral casing. The propulsion members can thus freely accelerate the air flow.

Preferably, the first rotor element is guided in rotation relative to the first peripheral stage, in particular by at least one ball bearing or a magnetic bearing.

Generally, the phases of the first peripheral stage are in line along the X-axis with the phases of the second peripheral stage. Thus, the magnetic field lines are optimized to avoid magnetic losses or any temperature rise due to induction.

According to a preferred aspect, the first phases of the first peripheral stage are in line along the X axis with the first phases of the second peripheral stage. Such a characteristic facilitates implementation of the stator element.

Preferably, the second phases of the first peripheral stage are in line along the X-axis with the third phases of the second peripheral stage.

Preferably, the electric current circulating in one phase of the first peripheral stage in one circulation direction and the electric current circulating in the phase of the second peripheral stage that is in line with the phase of the first peripheral stage, circulate in the same circulation direction. Magnetic losses are thus optimally reduced between the stages of the stator element.

Preferably, the peripheral stator element comprises an interface area between the first peripheral stage and the second peripheral stage, that comprises heat dissipation means, preferably thermal conductors, thermal paste or a cooling circuit. The interface area makes it possible firstly to connect the phases, and secondly to improve cooling at the center of the stator element.

Preferably, the aircraft electric propulsion unit comprises a propulsion inverter connected to the electric motor so as to control the current circulating in the phases of the stator element. Advantageously, the electric power chain of the propulsion unit comprises a single inverter.

The invention also relates to a method of using an electric propulsion unit as previously presented, comprising a step to supply current to the phases of the stator element, a step in which the first peripheral stage drives the first rotor element in rotation in the first direction of rotation and a step in which the second peripheral stage drives the second rotor element in rotation in the second direction of rotation opposite to the first direction of rotation.

BRIEF DESCRIPTION OF THE DRAWINGS

The invention will be better understood after reading the following description, given solely as an example, and with reference to the appended drawings given as non-limitative examples, wherein identical references are given to similar objects and wherein.

It should be noted that the figures present the invention in a detailed manner so that the invention can be put into practice, obviously said figures can be used to better define the invention if necessary.

DETAILED DESCRIPTION

An electric propulsion unit with a new design that can be mounted on an aircraft will now be presented. Preferably, several propulsion units P are mounted distributed on an aircraft for its propulsion and, more particularly for its vertical take-off and landing.

Figure 1:
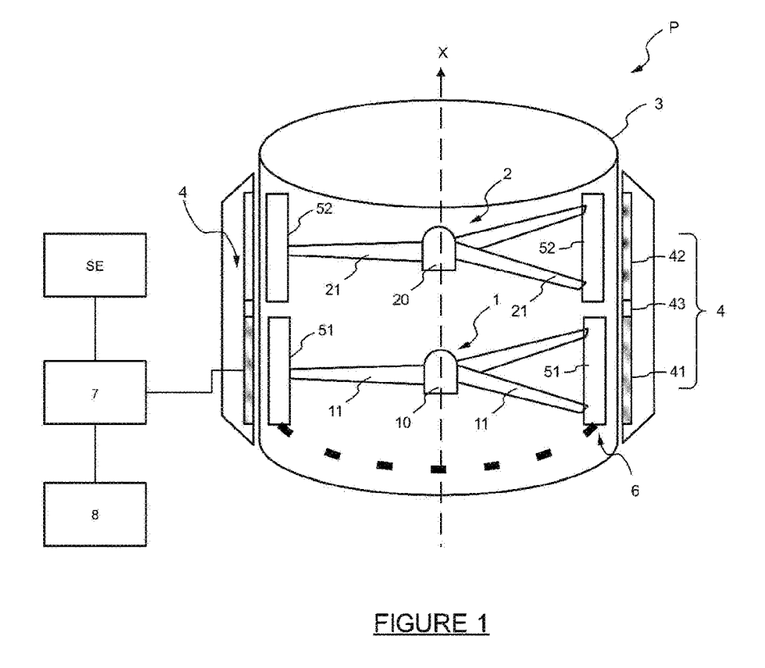
FIG. 1 is a diagrammatic representation of an embodiment of an electric propulsion unit according to the invention comprising two counter-rotating propulsion members and FIG. 2a is a sectional diagrammatic representation of a first rotating element driven by a first stator stage.

With reference to FIG. 1, the electric propulsion unit P comprises at least one first propulsion member 1 rotating about an X-axis and a second propulsion member 2 rotating about the X axis and a single electric motor with magnets 6 configured to drive the first propulsion member 1 in a first direction of rotation R1 and the second propulsion member 2 counter-rotating in a second direction of rotation R2.

Preferably, the electric propulsion unit P comprises only two propulsion members 1, 2. Nevertheless, it is obvious that the invention is applicable to more than 2 propulsion members 1, 2, in particular to an even number of propulsion members 1, 2.

In this example, the electric propulsion unit P comprises a peripheral casing 3 extending along the X axis in which the propulsion members 1, 2 are mounted in order to accelerate the air flow circulating inside the inner cavity of the peripheral casing 3. Obviously, the invention is also applicable to an electric propulsion unit P without a peripheral casing 3, the propulsion members 1, 2 then being open propellers.

According to the invention, the electric propulsion unit P comprises a peripheral stator element 4 that, in this example, is mounted inside the peripheral casing 3. The peripheral stator element 4 comprises a first peripheral stage 41 and a second peripheral stage 42 that are offset along the X axis. The electric propulsion unit P also comprises a first rotor element 51 that is rigidly attached to the first propulsion member 1, configured to be magnetically driven by the first peripheral stage 41 and a second rotor element 52 that is rigidly attached to the second propulsion member 2, configured to be magnetically driven by the second peripheral stage 42.

Figure 2A:
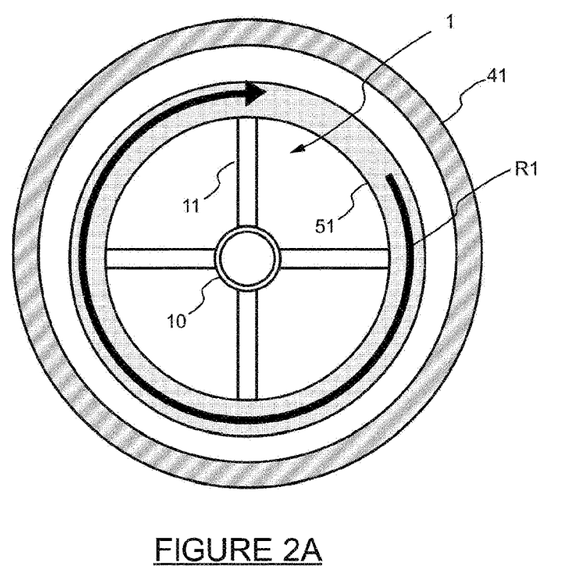
Figure 2B:
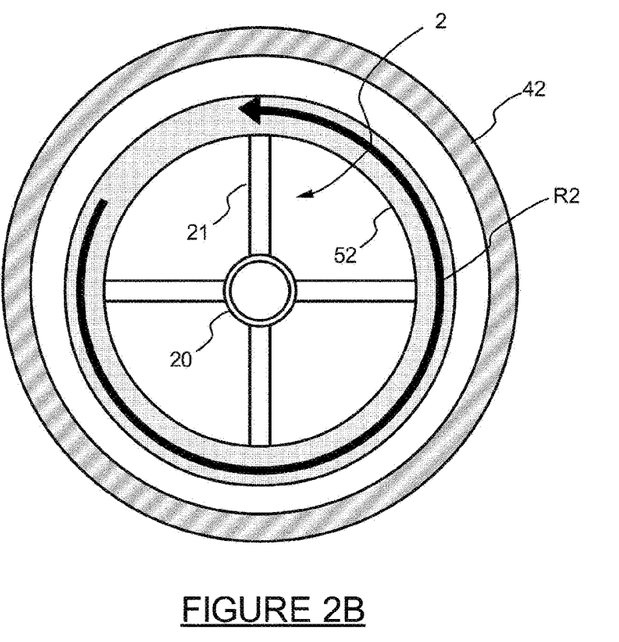
FIG. 2b is a sectional representation of a second rotating element driven by a second stator stage.

As illustrated in FIGS. 2A, 2B, in this embodiment, each propulsion member 1, 2 is in the form of a propeller comprising a central hub 10, 20 and a plurality of radial blades 11, 21, the radially inner ends of which are connected to the central hub 10, 20 and the radially outer ends of which are connected to a rotor element 51, 52.

In this example, the electric propulsion unit P comprises a propulsion inverter 7 to control the stator element 4, in particular, the current circulating through its phases P1, P2, P3 as will be described later. Preferably, the electric propulsion unit P comprises a computer 8 to implement the control laws. The propulsion inverter 7 is connected to an electric power supply source SE (for example, an on-board battery or an electric voltage generator associated with a rectifier) through a passive component, for example, a bus capacitor. The propulsion inverter 7 comprises a plurality of controllable switches that receive commands from the computer 8 that implements the control laws. Preferably, the bus capacitor is circular in order to limit space constraints when it is mounted in the electric propulsion unit P.

Figure 3:
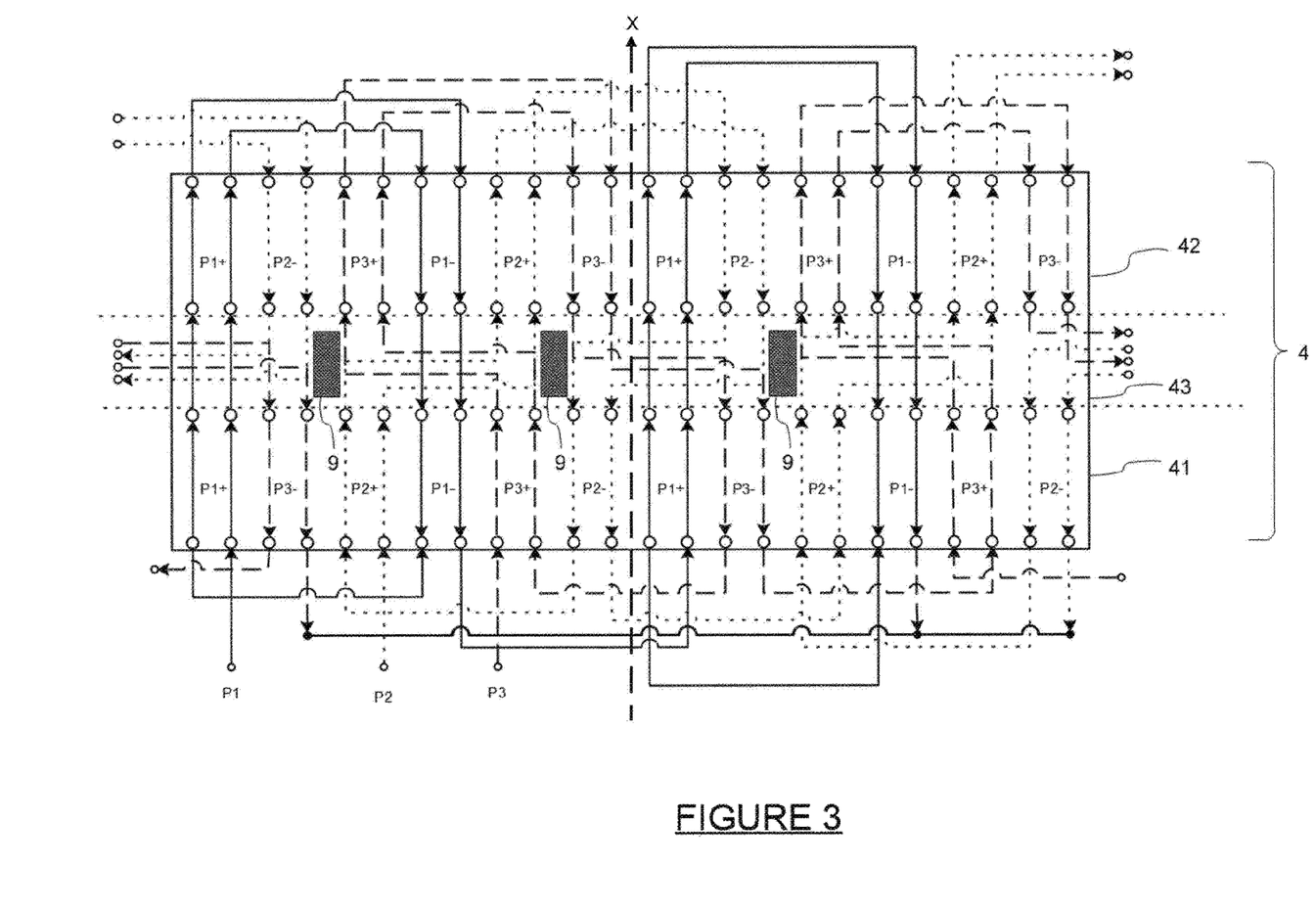
FIG. 3 is a partial diagrammatic representation of a stator of an electric motor comprising two stages driving the two propulsion members respectively.

As illustrated in FIG. 3, the first peripheral stage 41 comprises a first phase P1, a second phase P2 and a third phase P3 that are alternated according to a first sequence SEQ1 so as to allow the first rotor element 1 to rotate in the first direction of rotation R1. In this example, the first sequence SEQ1 is as follows: P1, P2, P3. Similarly, the second peripheral stage 42 comprises the first phase P1, the second phase P2 and the third phase P3 that are alternated according to a second sequence SEQ2 so as to allow the second rotor element 2 to rotate in the second direction of rotation R2 opposite to the first direction of rotation R1. In this example, the second sequence SEQ2 is as follows: P1, P3, P2. In other words, the second phase P2 and the third phase P3 are inverted in the second sequence SEQ2, compared with the first sequence SEQ1.

The use of a multiphase electric motor 6 increases the tolerance to defects, which increases the availability of the electric propulsion unit P.

As illustrated in FIG. 3, the first phase P1, the second phase P2 and the third phase P3 of the first peripheral stage 41 are electrically connected to the first phase P1, the second phase P2 and the third phase P3 of the second peripheral stage 42, respectively. Thus, the peripheral stages 41, 42 of the stator element 4 are interconnected and can be controlled by a single propulsion inverter 7. This sharing of the propulsion inverter 7 and of the control laws computer 8 makes it possible to reduce the size and mass of an electric propulsion unit P comprising two counter-rotating propulsion members 1 and 2.

Preferably, the first peripheral stage 41 and the second peripheral stage 42 comprise the same number of phases P1, P2, P3 in order to facilitate control of the stator element 4 by the propulsion inverter 7. In this example, a stator element 4 comprising only three phases P1, P2, P3 has been described. Nevertheless, it is obvious that the number of phases P1, P2, P3 could be more than 3.

As illustrated in FIG. 3, the phases P1, P2, P3 of the first peripheral stage 41 are in line along the X-axis with the phases P1, P2, P3 of the second peripheral stage 42 so as to limit electromagnetic disturbances. In particular, the first phases P1 of the first peripheral stage 41 are in line along the X axis with the first phases P1 of the second peripheral stage 42 so as to facilitate the design of the stator element 4. Furthermore, the second phases P2 of the first peripheral stage 41 are in line along the X-axis with the third phases P3 of the second peripheral stage 42 so that counter-rotation is possible.

With reference to FIG. 3, in order to limit electromagnetic disturbances, the electric current circulates in one phase P1, P2, P3 of the first peripheral stage 41 in one circulation direction, and circulates in the same circulation direction in phase P1, P2, P3 of the second peripheral stage 42 that is in line with phase P1, P2, P3 of the first peripheral stage 41. As illustrated in FIG. 3, the current circulates in the same direction in the first phases P1 that are in line along the X axis. Similarly, the current circulates in the same direction in the phases P2, P3 that are in line along the X axis As shown in FIG. 3, the peripheral stator element 4 comprises an interface area 43 between the first peripheral stage 41 and the second peripheral stage 42 to connect the phases P1, P2, P3 of the first peripheral stage 41 to the phases of the second peripheral stage 42. Preferably, the interface area 43 comprises heat dissipation means 9, in particular thermal conductors, thermal paste or a cooling circuit in order to evacuate calories generated by the Joule effect and calories related to rotation of the rotor elements 51, 52.

Advantageously, both faces of the rotor element 51, 52 and both faces of the stator element 4 are in contact with an air stream, which improves their cooling. Preferably, the peripheral casing 3 comprises a ventilation opening, in particular a slot, in order to facilitate cooling of the stator element 4.

With reference to FIG. 2A, the first rotor element 51 is in the form of a peripheral ring with its X-axis defining an internal cavity inside which the first propulsion member 1 is mounted, the radially outer ends of the blades 11 being connected to the first rotor element 51, in particular to the radially inner surface of the peripheral ring, the first rotor element 51 of which is shaped. The first rotor element 51 is installed to rotate inside the peripheral casing 3 facing the first stator stage 41.

Similarly, with reference to FIG. 2B, the second rotor element 52 is in the form of a peripheral ring with its X-axis defining an internal cavity inside which the second propulsion member 2 is mounted. The radially outer ends of the blades 21 are connected to the second rotor element 52, in particular to the radially inner surface of the peripheral ring, the second rotor element 52 of which is shaped. The second rotor element 52 is mounted to rotate inside the peripheral casing 3 facing the second stator stage 42. Thus, the first rotor element 51 and the second rotor element 52 are integrated into the first propulsion member 1 and the second propulsion member 2 respectively.

In this example, each rotor element 51, 52 comprises a plurality of magnetic poles, in particular arranged in pairs, so as to have a center of gravity located on the X axis. In a known manner, the poles interact with the rotating magnetic field generated by the current circulating in phases P1, P2, P3 so as to drive each rotor element 51, 52 and the propulsion member 1, 2 with which it is associated, in rotation.

Preferably, the rotor elements 51, 52 are guided in rotation in the peripheral casing 3 by means of guide bearings, in particular ball bearings or magnetic bearings. In other words, the rotor elements 51, 52 are driven at the periphery rather than at the center as in a conventional propulsion unit. The structure of the central hub is lighter, and does not affect circulation of the air flow.

Preferably, the electric motor 6 is a permanent magnet motor, in particular with radial flux. Preferably, an electric motor 6 of the Halbach type is preferred because it makes it possible to increase the power density of the system (increased power for constant footprint/mass).

An example of an application of a method of using an electric propulsion unit P according to the invention will now be presented.

Figure 4:
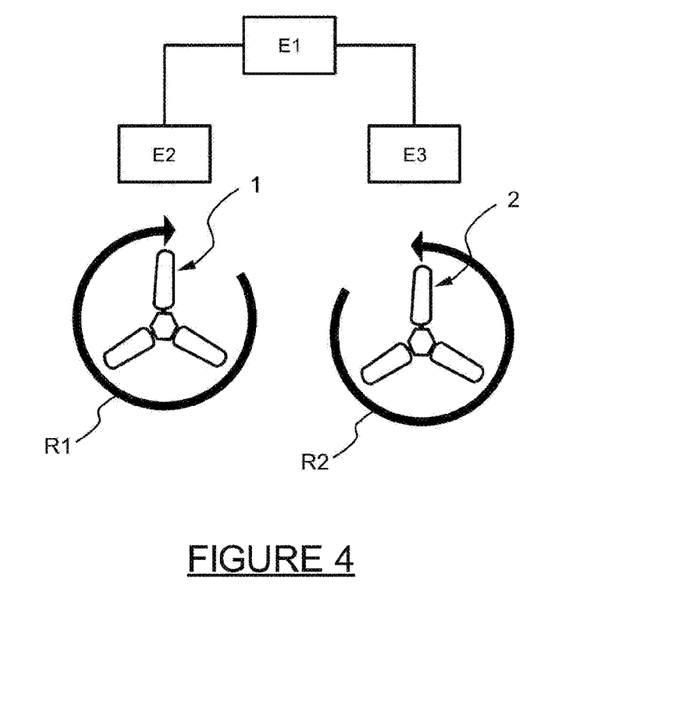
FIG. 4 is a diagrammatic representation of steps for implementation of the invention.

With reference to FIG. 4, the method comprises a step E1 to supply current to the phases P1, P2, P3 of the stator element 4 through the propulsion inverter 7 following a command output from the control laws computer 8. Advantageously, each stator stage 41, 42 is powered by a single propulsion inverter 7, which limits the number and the mass of components.

Following the power supply step E1, the method comprises a drive step E2 rotating the first rotor element 1 in the first direction of rotation R1 through the first peripheral stage 41 due to circulation of current in phases P1, P2, P3.

Similarly, due to the circulation of current in the phases P1, P2, P3 of the second peripheral stage 42, the method comprises a drive step E3 rotating the second rotor element 2 in the second direction of rotation R2 through the second peripheral stage 42. The directions of rotation of the propulsion members 1, 2 are advantageously opposite because the phase sequences SEQ1, SEQ2 are different.

In this example, each propulsion member 1, 2 is guided in rotation about the X axis inside the peripheral casing 3 through guide bearings positioned at the interface between the peripheral casing 3 and the rotor elements 51, 52 connected to propulsion members 1, 2 respectively. The heat dissipation means 9 positioned in the interface area 43 of the stator element 4 advantageously make it possible to prevent overheating during operation of the electric propulsion unit P.

The invention claimed is:

1. An electric propulsion unit for an aircraft, the electric propulsion unit comprising a first propulsion member rotating about an axis, a second propulsion member rotating about the axis, and a single electric motor with magnets configured to drive the first propulsion member in a first direction of rotation and the second propulsion member counter-rotating in a second direction of rotation, wherein the electric motor comprises:
    a peripheral stator element comprising a first peripheral stage and a second peripheral stage that are offset along the axis;
    a first rotor element rigidly attached to the first propulsion member and configured to be magnetically driven by the first peripheral stage;
    a second rotor element rigidly attached to the second propulsion member and configured to be magnetically driven by the second peripheral stage;
    the first peripheral stage comprising at least a first phase, a second phase, and a third phase that are alternated according to a first sequence so as to allow the first rotor element to rotate in the first direction of rotation;
    the second peripheral stage comprising at least the first phase, the second phase and the third phase that are alternated according to a second sequence so as to allow the second rotor element to rotate in the second direction of rotation opposite to the first direction of rotation; and
    the first phase, the second phase and the third phase of the first peripheral stage are electrically connected to the first phase, the second phase and the third phase of the second peripheral stage, respectively.

2. The electric propulsion unit for an aircraft according to claim 1, wherein the electric propulsion unit comprises a peripheral casing extending along the axis, the propulsion members being mounted inside the peripheral casing.

3. The electric propulsion unit for an aircraft according to claim 2, wherein the rotor elements are guided in the peripheral casing.

4. The electric propulsion unit for an aircraft according to claim 1, wherein the first rotor element and the second rotor element each has a peripheral form.

5. The electric propulsion unit for an aircraft according to claim 1, wherein the first rotor element and the second rotor element are mounted external to the first propulsion member and the second propulsion member respectively.

6. The electric propulsion unit for an aircraft according to claim 1, wherein the first rotor element is guided in rotation relative to the first peripheral stage, in particular by at least one ball bearing.

7. The electric propulsion unit for an aircraft according to claim 1, wherein the phases of the first peripheral stage are in line along the axis with the third phases of the second peripheral stage.

8. The electric propulsion unit for an aircraft according to claim 1, wherein the second phases of the first peripheral stage are in line along the axis with the third phases of the second peripheral stage.

9. The electric propulsion unit for an aircraft according to claim 1, wherein electric current circulating in one phase of the first peripheral stage in one circulation direction and the electric current circulating in the phase of the second peripheral stage that is in line with the phase of the first peripheral stage, circulate in the same circulation direction.

10. The electric propulsion unit for an aircraft according to claim 1, wherein the peripheral stator element comprises an interface area, between the first peripheral stage and the second peripheral stage, that comprises heat dissipation means.

11. A method of using the electric propulsion unit according to claim 1, comprising a step to supply current to the phases of the stator element, a step in which the first peripheral stage drives the first rotor element in rotation in the first direction of rotation and a step in which the second peripheral stage drives the second rotor element in rotation in the second direction of rotation opposite to the first direction of rotation.

12. An electric propulsion unit for an aircraft comprising:
    a first propulsion member having a plurality of blades rotating about an axis in a first direction of rotation;
    a second propulsion member having a plurality of blades rotating about the axis in a second direction of rotation, which is opposite the first direction of rotation;
    a single electric motor with magnets configured to drive the first propulsion member and the second propulsion member in the first direction of rotation and the second direction of rotation, respectively;
    a peripheral stator element comprising a first peripheral stage and a second peripheral stage that are offset along the axis;
    a first rotor element rigidly attached to the plurality of blades of the first propulsion member and configured to be magnetically driven by the first peripheral stage;
    a second rotor element rigidly attached to the plurality of blades of the second propulsion member and configured to be magnetically driven by the second peripheral stage;
    the first peripheral stage comprising at least a first phase, a second phase, and a third phase that are alternated according to a first sequence so as to allow the first rotor element to rotate in the first direction of rotation;
    the second peripheral stage comprising at least the first phase, the second phase and the third phase that are alternated according to a second sequence so as to allow the second rotor element to rotate in the second direction of rotation opposite to the first direction of rotation; and
    the first phase, the second phase and the third phase of the first peripheral stage are electrically connected to the first phase, the second phase and the third phase of the second peripheral stage, respectively.

13. The electric propulsion unit for an aircraft according to claim 12, a perimeter casing surrounding the first propulsion member and the second propulsion member.

14. The electric propulsion unit for an aircraft according to claim 13, wherein the rotor elements are guided in the peripheral casing.

15. The electric propulsion unit for an aircraft according to claim 12, wherein the first sequence is electrically connected according to phase sequence P1, P2, P3 and the second sequence is electrically connected according to phase sequence P1, P3, P2.

16. An electric propulsion unit for an aircraft comprising:
    a first propulsion member having a plurality of blades rotating about an axis in a first direction of rotation;

a second propulsion member having a plurality of blades rotating about the axis in a second direction of rotation, which is opposite the first direction of rotation;

a single electric motor with magnets configured to drive the first propulsion member and the second propulsion member in the first direction of rotation and the second direction of rotation, respectively;

a peripheral stator element comprising a first peripheral stage and a second peripheral stage that are offset along the axis;

a first rotor element rigidly attached to the plurality of blades of the first propulsion member and configured to be magnetically driven by the first peripheral stage;

a second rotor element rigidly attached to the plurality of blades of the second propulsion member and configured to be magnetically driven by the second peripheral stage;

the first peripheral stage comprising at least a first phase, a second phase, and a third phase that are alternated according to a first sequence so as to allow the first rotor element to rotate in the first direction of rotation;

the second peripheral stage comprising at least the first phase, the second phase and the third phase that are alternated according to a second sequence so as to allow the second rotor element to rotate in the second direction of rotation opposite to the first direction of rotation; and the first phase, the second phase and the third phase of the first peripheral stage are electrically connected to the first phase, the second phase and the third phase of the second peripheral stage, respectively; and wherein electric current circulating in one phase of the first peripheral stage in one circulation direction and the electric current circulating in the phase of the second peripheral stage that is in line with the phase of the first peripheral stage, circulate in the same circulation direction.

17. The electric propulsion unit for an aircraft according to claim 16, wherein the rotor elements are guided in the peripheral casing.

18. The electric propulsion unit for an aircraft according to claim 16, wherein the first sequence is electrically connected according to phase sequence P1, P2, P3 and the second sequence is electrically connected according to phase sequence P1, P3, P2.

19. The electric propulsion unit for an aircraft according to claim 16, further comprising a perimeter casing surrounding the first propulsion member and the second propulsion member.

* * * * *